United States Patent
Chen

(10) Patent No.: US 8,651,246 B2
(45) Date of Patent: Feb. 18, 2014

(54) ELECTROMAGNETIC BRAKE STRUCTURE

(76) Inventor: Xiu-Feng Chen, Dajia Township, Taichung County (TW)

(*) Notice: Subject to any disclaimer, the term of this patent is extended or adjusted under 35 U.S.C. 154(b) by 153 days.

(21) Appl. No.: 12/891,803

(22) Filed: Sep. 27, 2010

(65) Prior Publication Data

US 2012/0073916 A1    Mar. 29, 2012

(51) Int. Cl.
*F16D 65/28* (2006.01)

(52) U.S. Cl.
USPC .............. 188/171; 188/161; 310/77; 335/281

(58) Field of Classification Search
USPC .............. 188/161, 171, 71.2; 310/77, 93, 268, 310/215, 214, 194; 335/291, 282, 219, 281
See application file for complete search history.

(56) References Cited

U.S. PATENT DOCUMENTS 4,305,485 A * 12/1981 Dubreucq ............... 188/164
4,719,377 A * 1/1988 Horie et al. ............. 310/44
2005/0017596 A1 * 1/2005 Naito et al. ............. 310/268
2009/0108711 A1 * 4/2009 Kim et al. ............... 310/49 R
2009/0267442 A1 * 10/2009 Yamawaki et al. ...... 310/215

FOREIGN PATENT DOCUMENTS

JP    62288735 A  * 12/1987
JP    2000179583 A * 6/2000

OTHER PUBLICATIONS

Machine translation of JP 2000179583 A.*

* cited by examiner

*Primary Examiner* — Anna Momper

(57) ABSTRACT

An electromagnetic brake contains a coil seat including plural receiving holes disposed on a front end thereof to receive plural compression springs respectively and an electromagnetic coil mounted on the front end thereof; a movable friction piece fitted on the front end thereof; a brake member fixed in a front end of the friction piece and including a transmitting shaft fitted thereon; a fixed member secured on a front end of the brake member, wherein the electromagnetic coil includes a first silicon steel ring, a plurality of slots and a number of elongate grooves, and each slot includes an isolation holder fitted therein, and the isolation holder includes a recess formed on one side thereof to correspond to the groove of the first silicon steel ring, and between two abutting isolation holders is provided with a coil set formed by an enameled copper wire.

1 Claim, 5 Drawing Sheets

ELECTROMAGNETIC BRAKE STRUCTURE

BACKGROUND OF THE INVENTION

1. Field of the Invention

The present invention relates to an electromagnetic brake structure that the transmitting shaft and other parts are not interfered by magnetism to keep smooth operation and prolong service life.

2. Description of the Prior Art

Conventional electromagnetic brake structure includes an electromagnetic coil disposed in a brake so that magnetic attraction generating from the electromagnetic coil to press the spring. After the power is off, the spring is recovered to have a brake effect. Referring to FIG. 5, an electromagnetic brake 70 includes a fixed seat 71, the fixed seat 71 includes a bush 71 fitted on one end thereof and a groove 73 to receive an electromagnetic coil 74 wrapped by an enameled copper wire, when the electromagnetic coil 74 is conducted power, a magnetism generates to attract a friction piece 75 magnetically, and the electromagnetic coil 74 actuates a transmitting shaft 76 to generate a magnetic action, hence all parts installed on the transmitting shaft 76 are damaged to lower service life of the parts, such as a bearing, and then a magnetic line 8 stops the bearing from operation to lower a rotating speed of the transmitting shaft 76, and iron dusts are attracted by the transmitting shaft 76 to affect service life of the bearing. Moreover, the entire magnetic effect generated from the electromagnetic coil 74 is not acted on the friction piece 75 but magnetic coil forms on the transmitting shaft 76 from some magnetic effect of the electromagnetic coil 74 to lower a magnetic attraction to the friction piece 75.

The present invention has arisen to mitigate and/or obviate the afore-described disadvantages.

SUMMARY OF THE INVENTION

The primary object of the present invention is to provide an electromagnetic brake structure that therefore the transmitting shaft and other parts are not interfered by magnetism, such that iron dusts do not attach on the transmitting shaft and the other parts to keep smooth operation and prolong service life. Furthermore, the magnetic lines generated from the electromagnetic coil are acted on the friction piece to obtain high magnetic effect.

Another object of the present invention is to provide an electromagnetic brake structure that the second steel ring is received in the notch of the friction piece to increase magnetic reaction so as to match with the coil set, thus generating magnetic attraction and achieving high magnetic effect of the friction piece and the coil seat.

An electromagnetic brake structure in accordance with a preferred embodiment of the present invention comprises:

a coil seat including a plurality of receiving holes disposed on a front end thereof to receive a number of compression springs respectively and an electromagnetic coil mounted on the front end thereof;

a movable friction piece fitted on the front end of the coil seat 10;

a brake member fixed in a front end of the friction piece and including a transmitting shaft fitted thereon to actuate with the brake member;

a fixed member secured on a front end of the brake member and locked with the coil seat, wherein the electromagnetic coil includes a first silicon steel ring, a plurality of slots arranged around a peripheral side of the first silicon steel ring, a number of elongate grooves radially extending along an outer side of the first silicon steel ring and communicating with the slots respectively, and each slot includes an isolation holder fitted therein, and the isolation holder includes a recess formed on one side thereof to correspond to the groove of the first silicon steel ring, and between two abutting isolation holders is provided with a coil set formed by an enameled copper wire.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
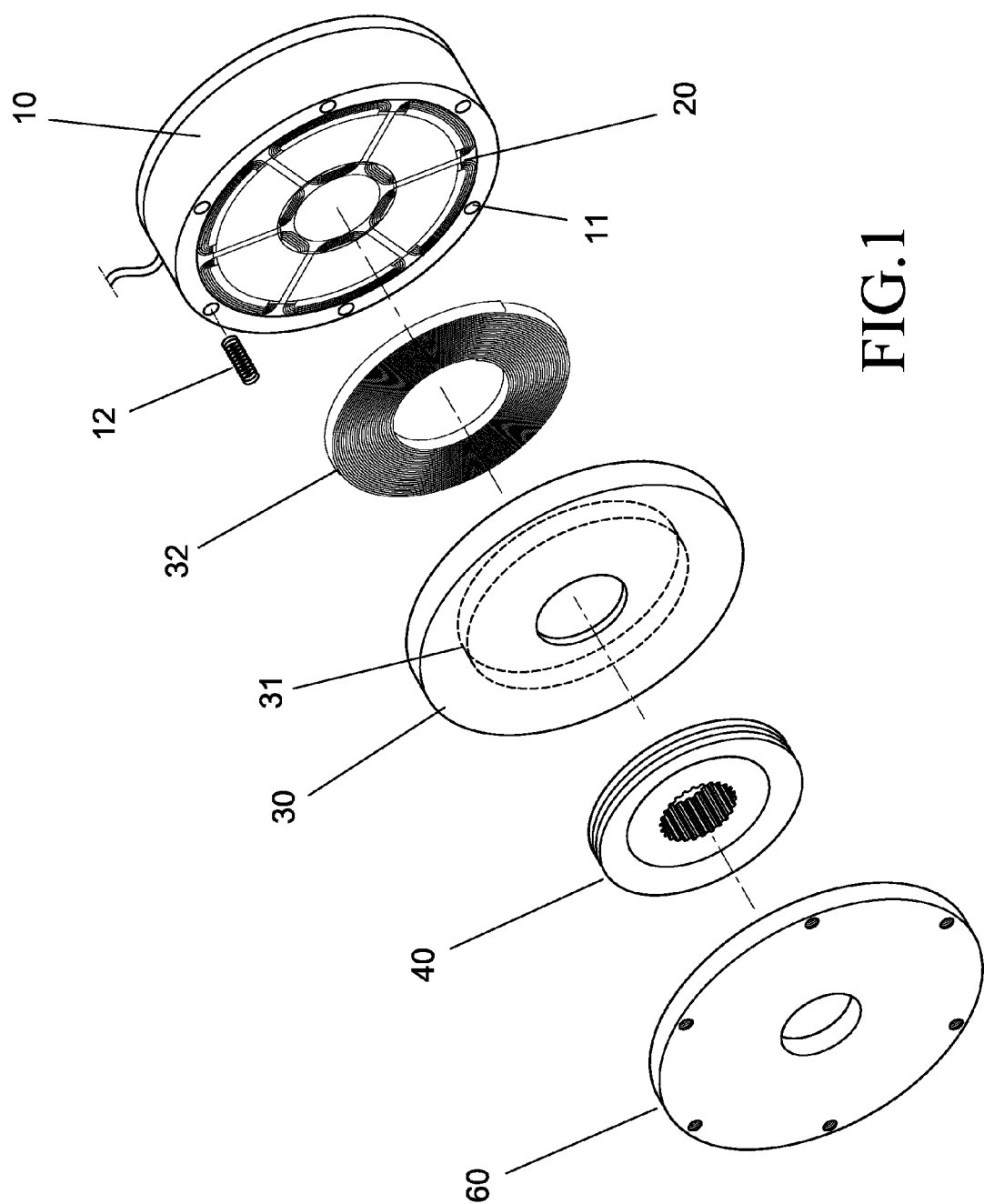
FIG. 1 is a perspective view showing the exploded components of an electromagnetic brake structure in accordance with a preferred embodiment of the present invention.
Figure 2:
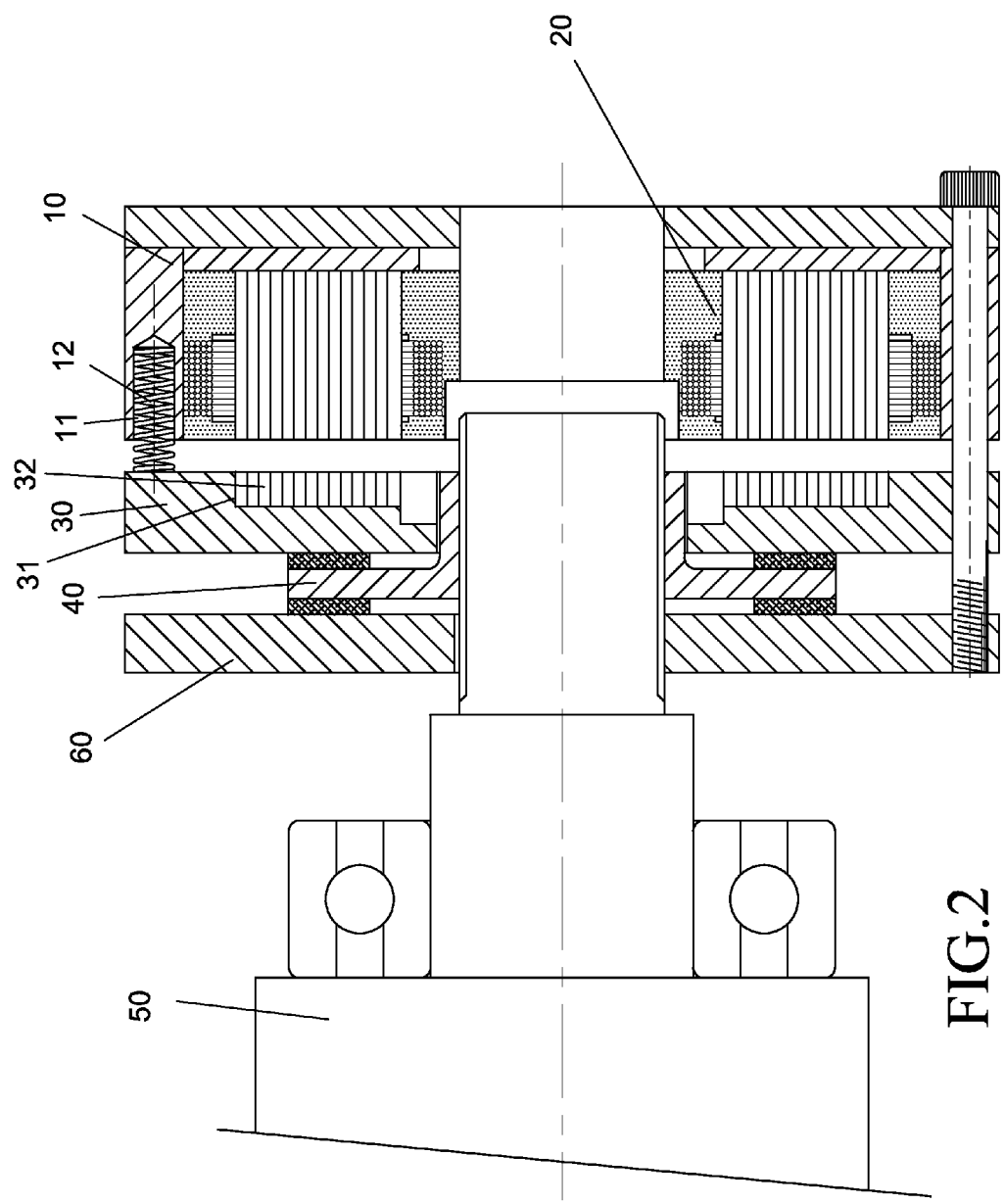
FIG. 2 is a cross sectional view showing the assembly of the electromagnetic brake structure in accordance with the preferred embodiment of the present invention.

Referring to FIGS. 1 and 2, an electromagnetic brake structure according to a preferred embodiment of the present invention comprises:

a coil seat 10 including a plurality of receiving holes 11 disposed on a front end thereof to receive a number of compression springs 12 respectively and an electromagnetic coil 20 mounted on the front end thereof;

a movable friction piece 30 fitted on the front end of the coil seat 10;

a brake member 40 fixed in a front end of the friction piece 30 and including a transmitting shaft 50 fitted thereon to actuate with the brake member 40;

a fixed member 60 secured on a front end of the brake member 40 and locked with the coil seat 10.

Figure 3:
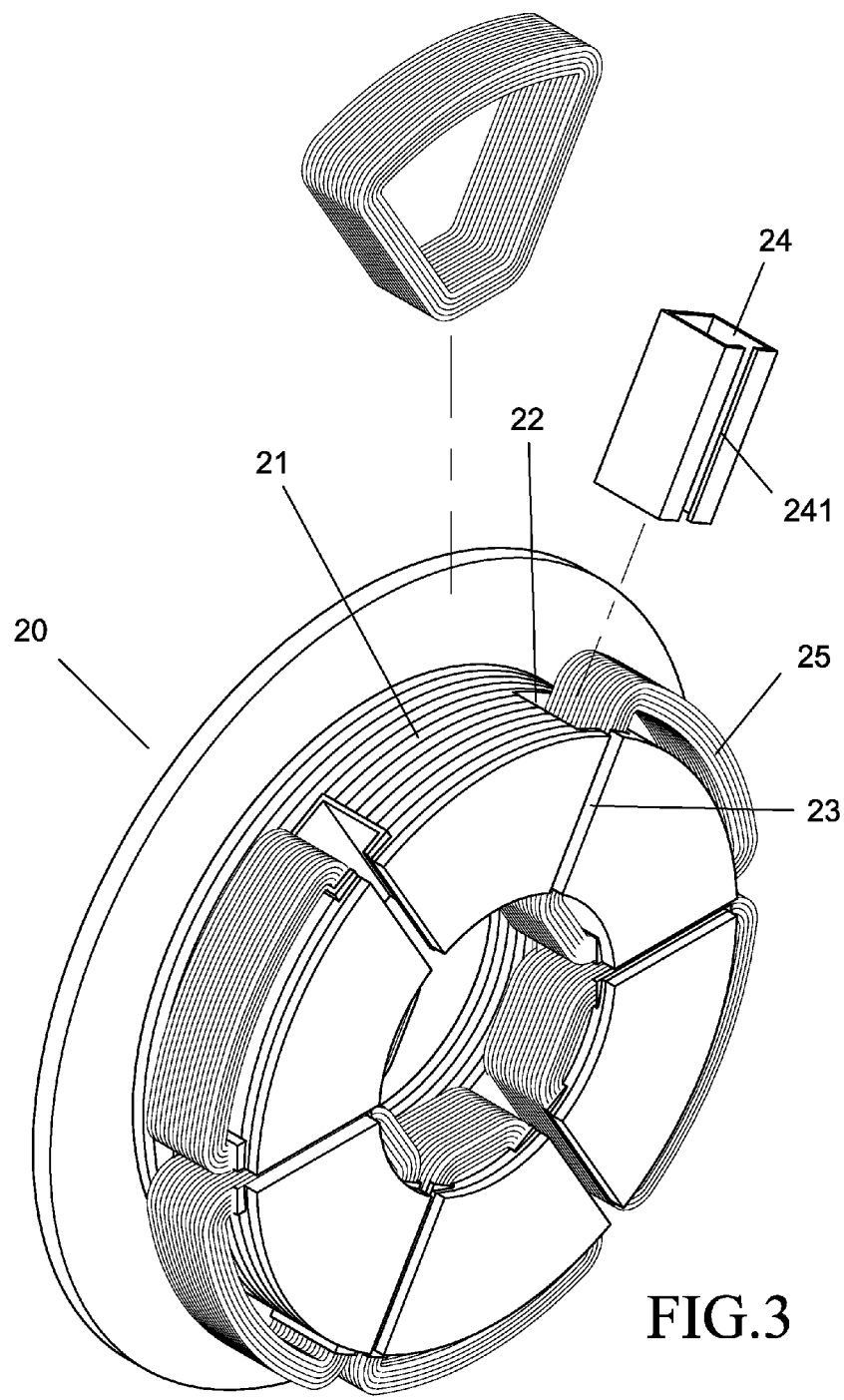
FIG. 3 is a cross sectional view showing the assembly of an electromagnetic coil of the electromagnetic brake structure in accordance with the preferred embodiment of the present invention.

As shown in FIG. 3, the electromagnetic coil 20 includes a first silicon steel ring 21, a plurality of slots 22 arranged around a peripheral side of the first silicon steel ring 21, a number of elongate grooves 23 radially extending along an outer side of the first silicon steel ring 21 and communicating with the slots 22 respectively, and each slot 22 includes an isolation holder 24 fitted therein, and the isolation holder 24 includes a recess 241 formed on one side thereof to correspond to the groove 23 of the first silicon steel ring 21, and between two abutting isolation holders 24 is provided with a coil set 25 formed by an enameled copper wire.

With reference to FIGS. 1 and 2, the friction piece 30 includes a notch 31 disposed at a position thereof in response to the first silicon steel ring 21 of the electromagnetic coil 20 to receive a second steel ring 32.

Figure 4:
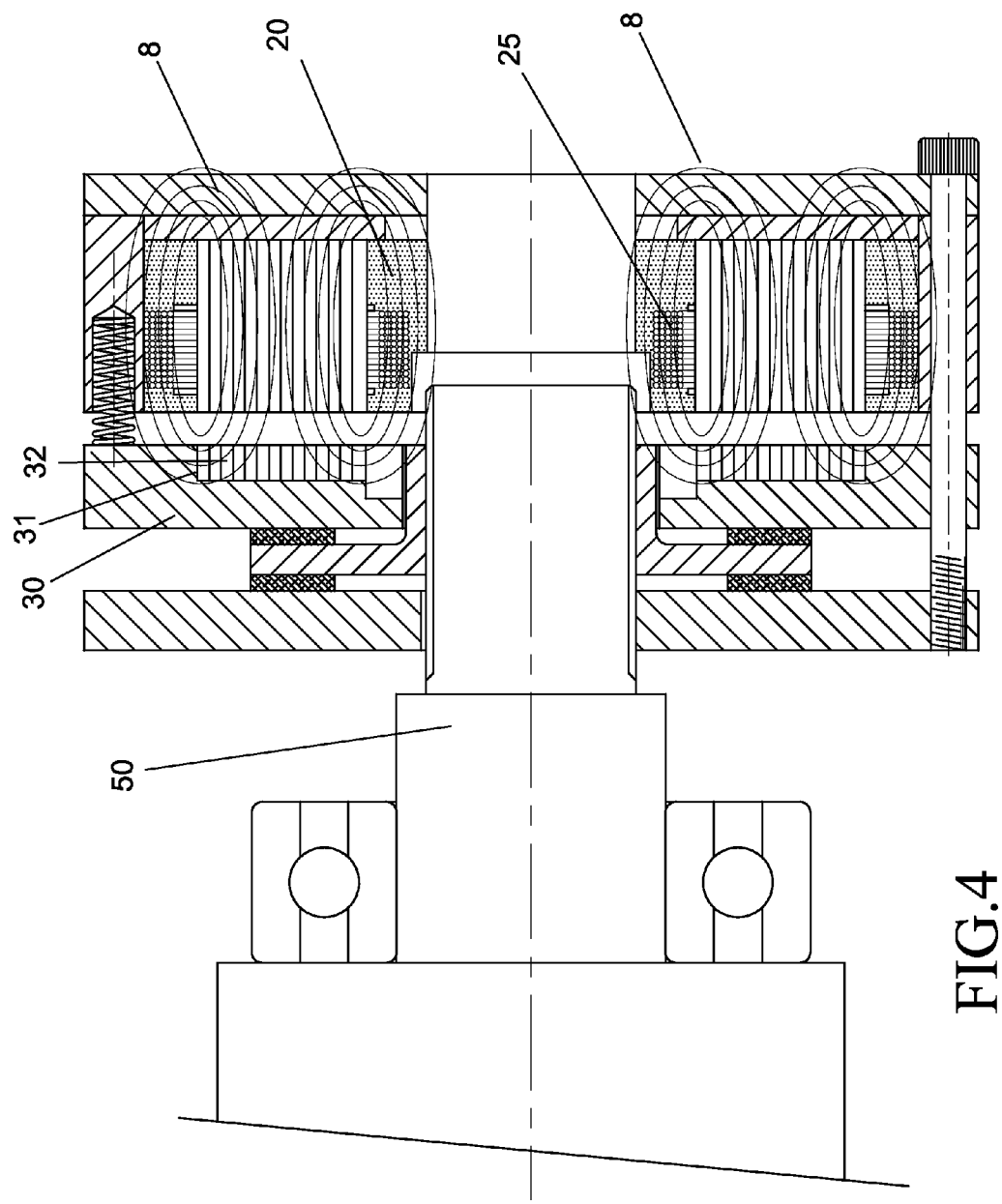
FIG. 4 is a cross sectional view showing the operation of the electromagnetic brake structure in accordance with the preferred embodiment of the present invention.
Figure 5:
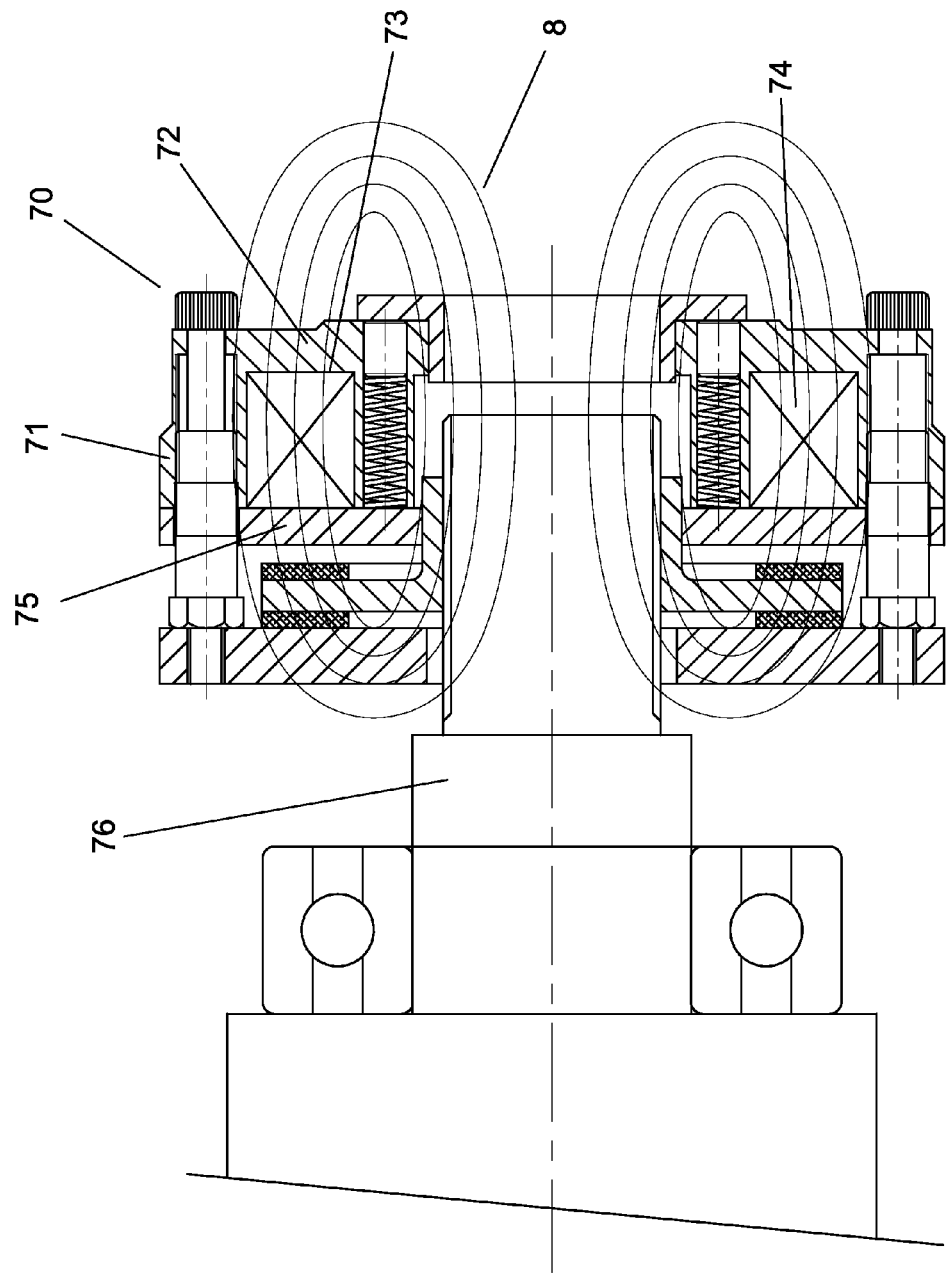
FIG. 5 is a cross sectional view showing the assembly of a conventional electromagnetic brake structure.

As illustrated in FIG. 4, the electromagnetic coil 20 includes a number of coil sets 25 surrounding therearound to generate a magnetic line 8 within the electromagnetic coil 20 and without over the electromagnetic coil 20, therefore the transmitting shaft 50 is not affected by magnetism, and other parts (such as a bearing) are not interfered by magnetism, such that iron dusts do not attach on the transmitting shaft 50 and the other parts to keep smooth operation and prolong service life. Furthermore, the magnetic lines generated from the electromagnetic coil 20 are acted on the friction piece 30 to obtain high magnetic effect.

Also, the second steel ring 32 is received in the notch 31 of the friction piece 30 to increase magnetic reaction so as to match with the coil set 25, thus generating magnetic attraction and achieving high magnetic effect of the friction piece 30 and the coil seat 10.

While we have shown and described various embodiments in accordance with the present invention, it is clear to those skilled in the art that further embodiments may be made without departing from the scope of the present invention.

What is claimed is:

1. An electromagnetic brake structure comprising:
   a coil seat including a plurality of receiving holes disposed on a front end thereof to receive a number of compression springs respectively and an electromagnetic coil mounted on the front end thereof;
   a movable friction piece fitted on the front end of the coil seat;
   a brake member fixed in a front end of the friction piece and including a transmitting shaft fitted thereon to actuate with the brake member;
   a fixed member secured on a front end of the brake member and locked with the coil seat, wherein
   the electromagnetic coil includes a first silicon steel ring, a plurality of slots arranged around a peripheral side of the first silicon steel ring, a number of elongate grooves radially extending along an outer side of the first silicon steel ring and communicating with the slots respectively, and each slot includes an isolation holder fitted therein, and the isolation holder includes a recess formed on one side thereof to correspond to the groove of the first silicon steel ring, and between two isolation holders is provided with a coil set formed by an enameled copper wire; and
   the friction piece includes a notch defined at a position thereof and corresponding to the first silicon steel ring of the electromagnetic coil so as to receive a second steel ring for matching with the coil set.

* * * * *